UNITED STATES PATENT OFFICE.

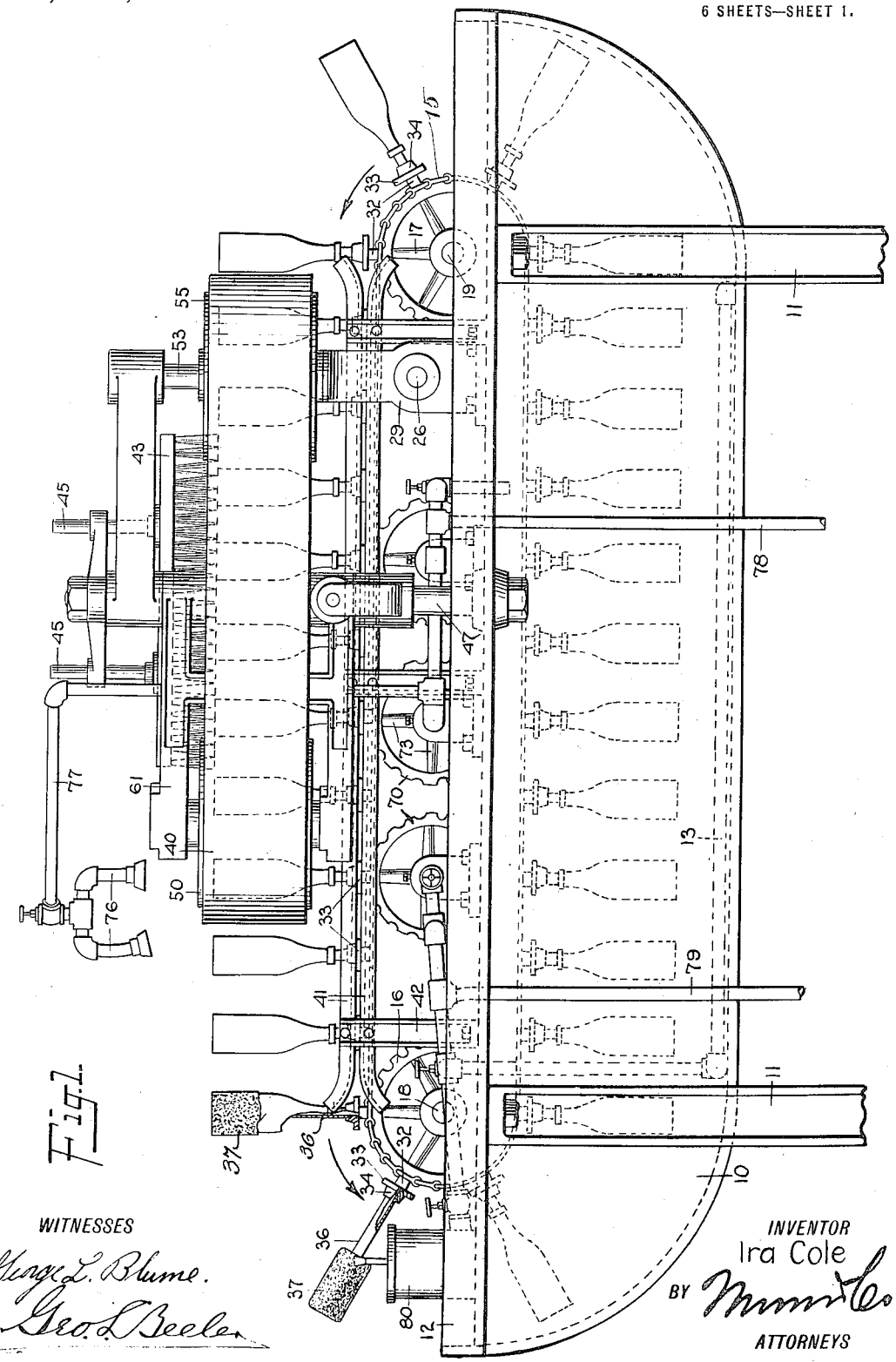

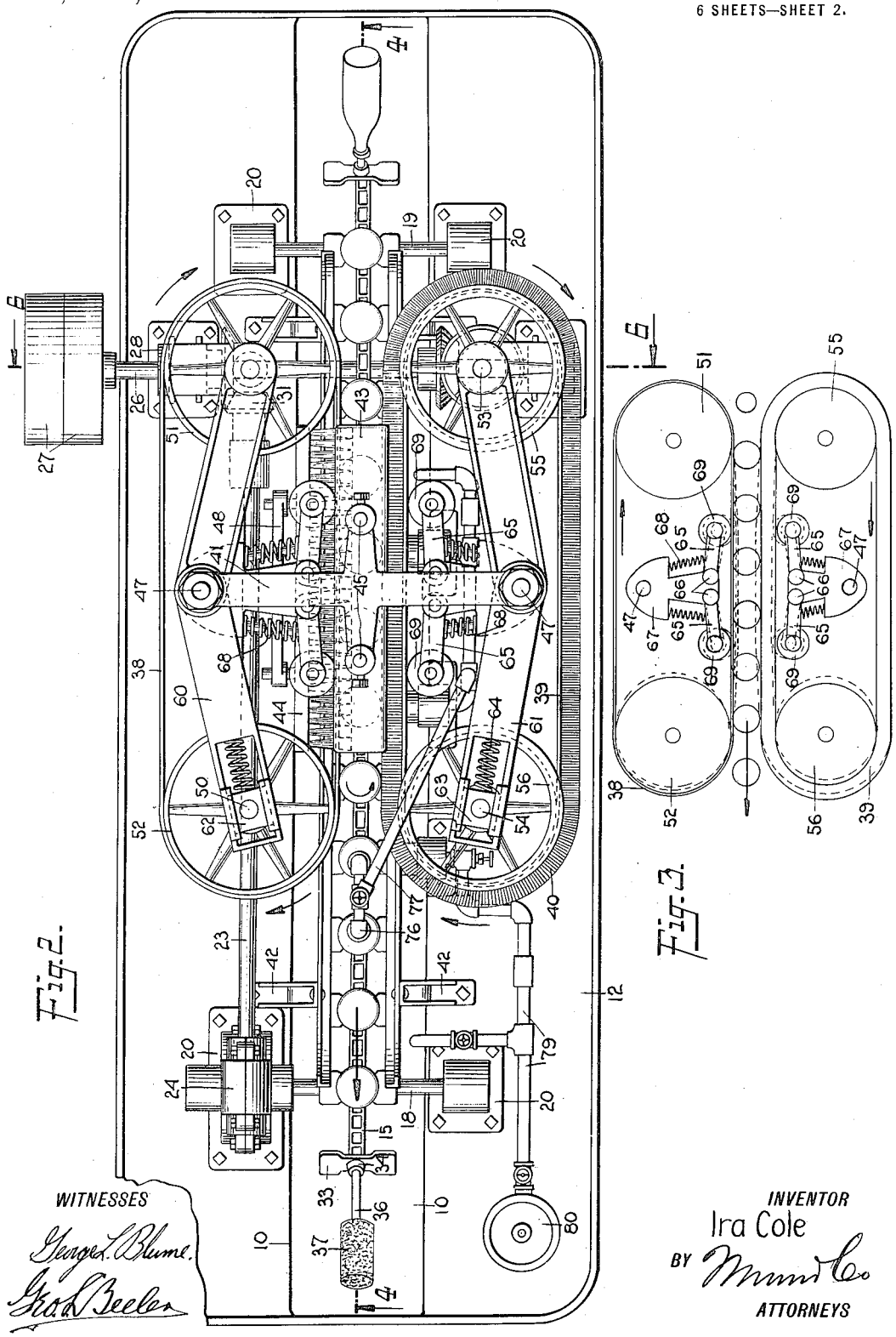

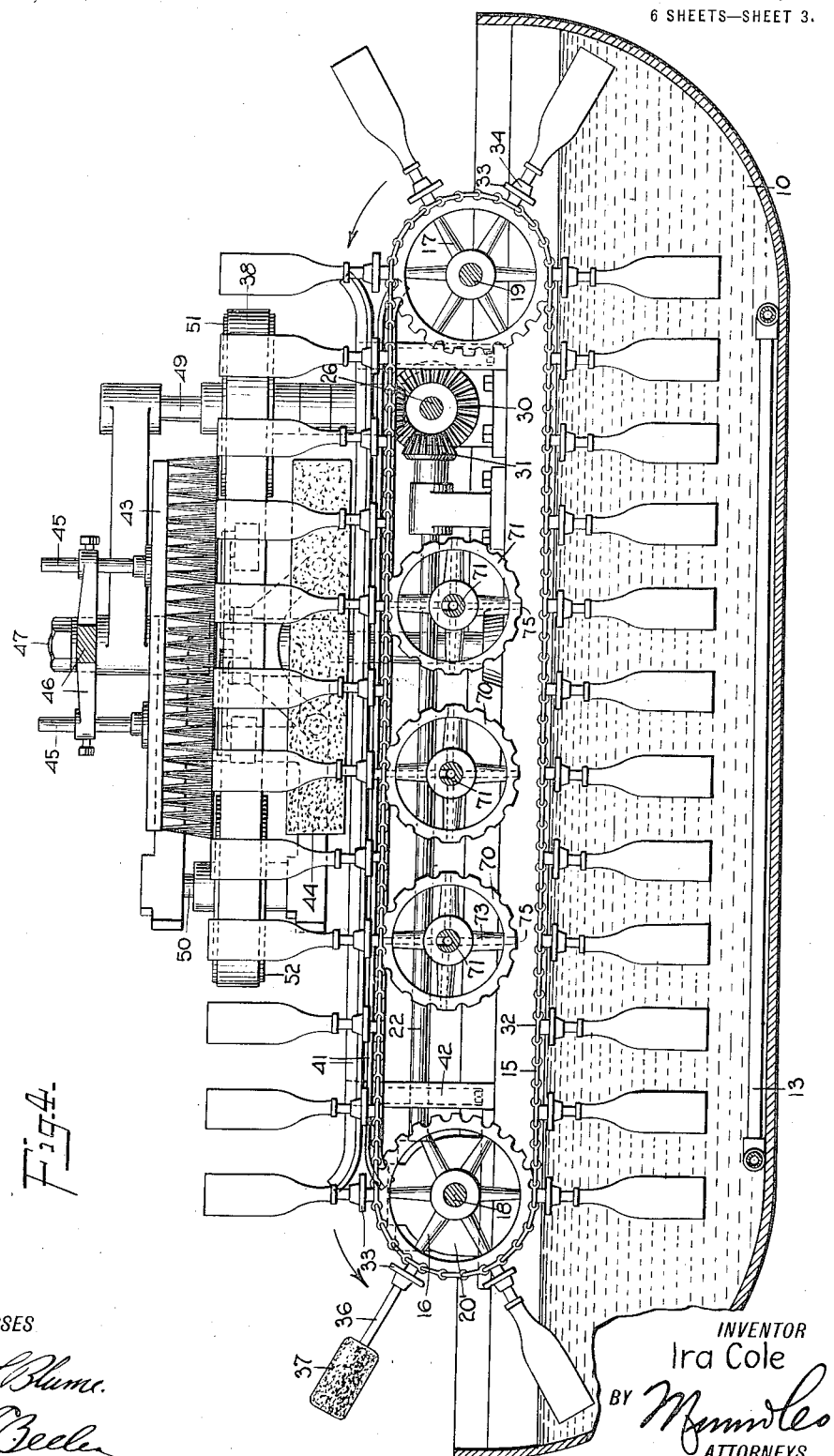

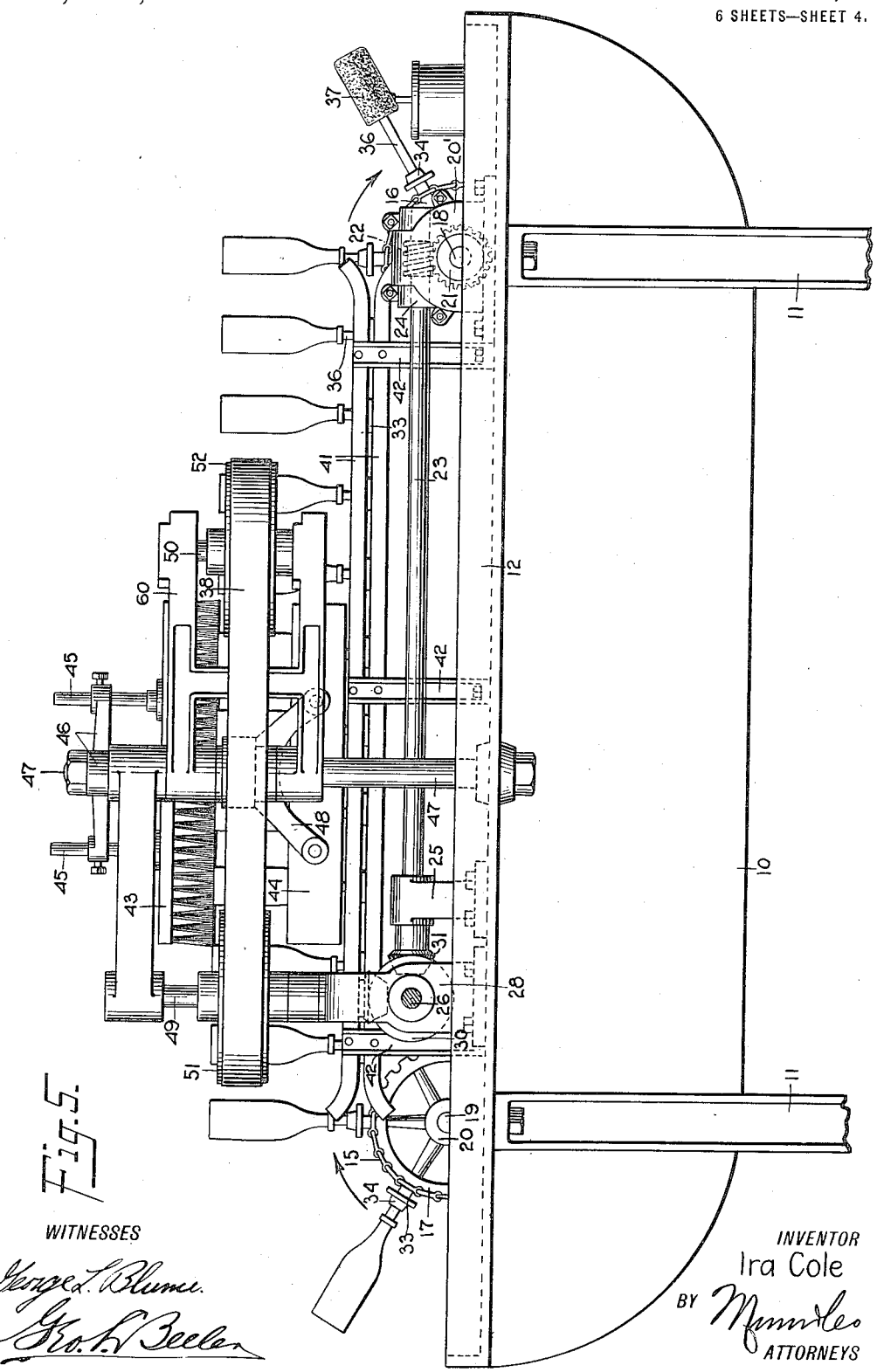

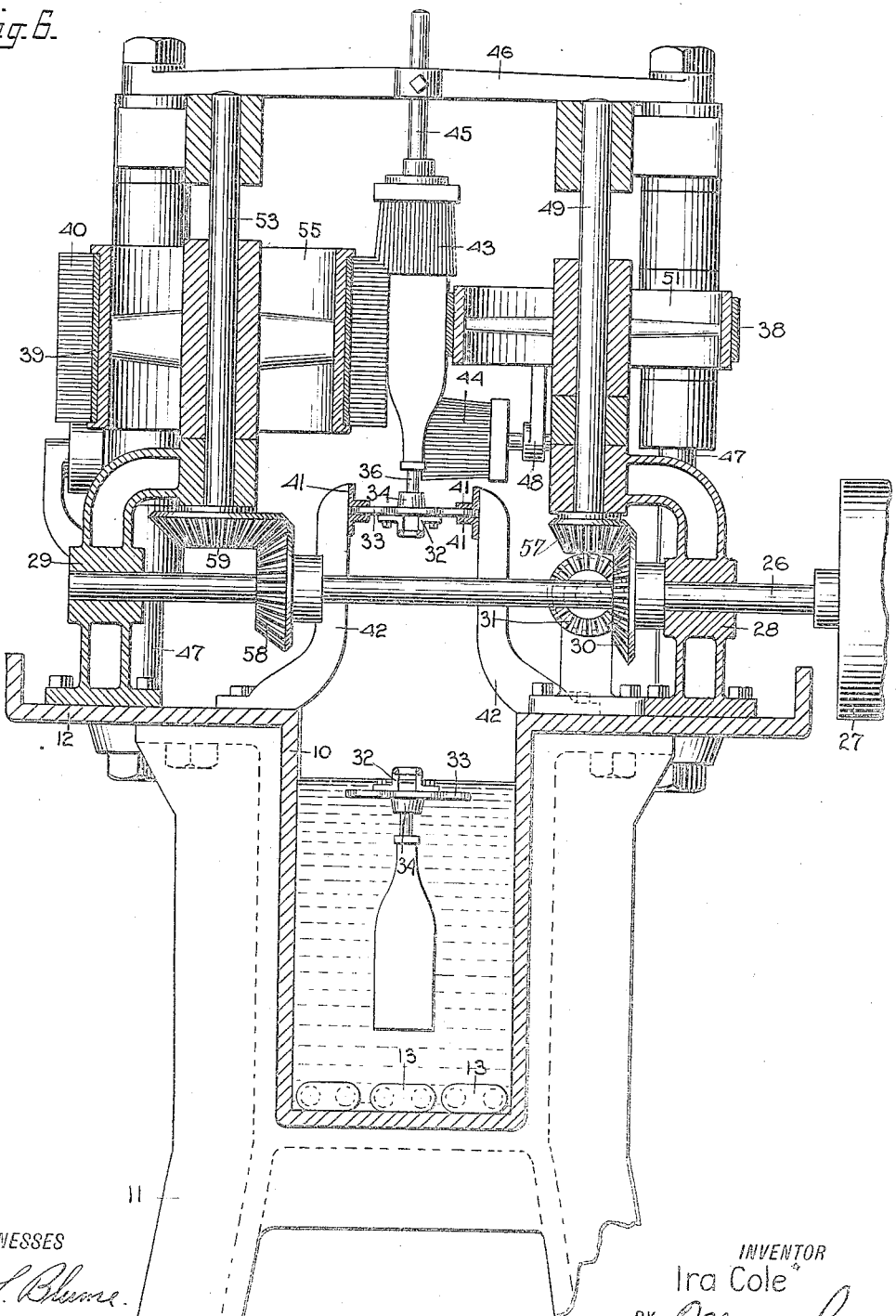

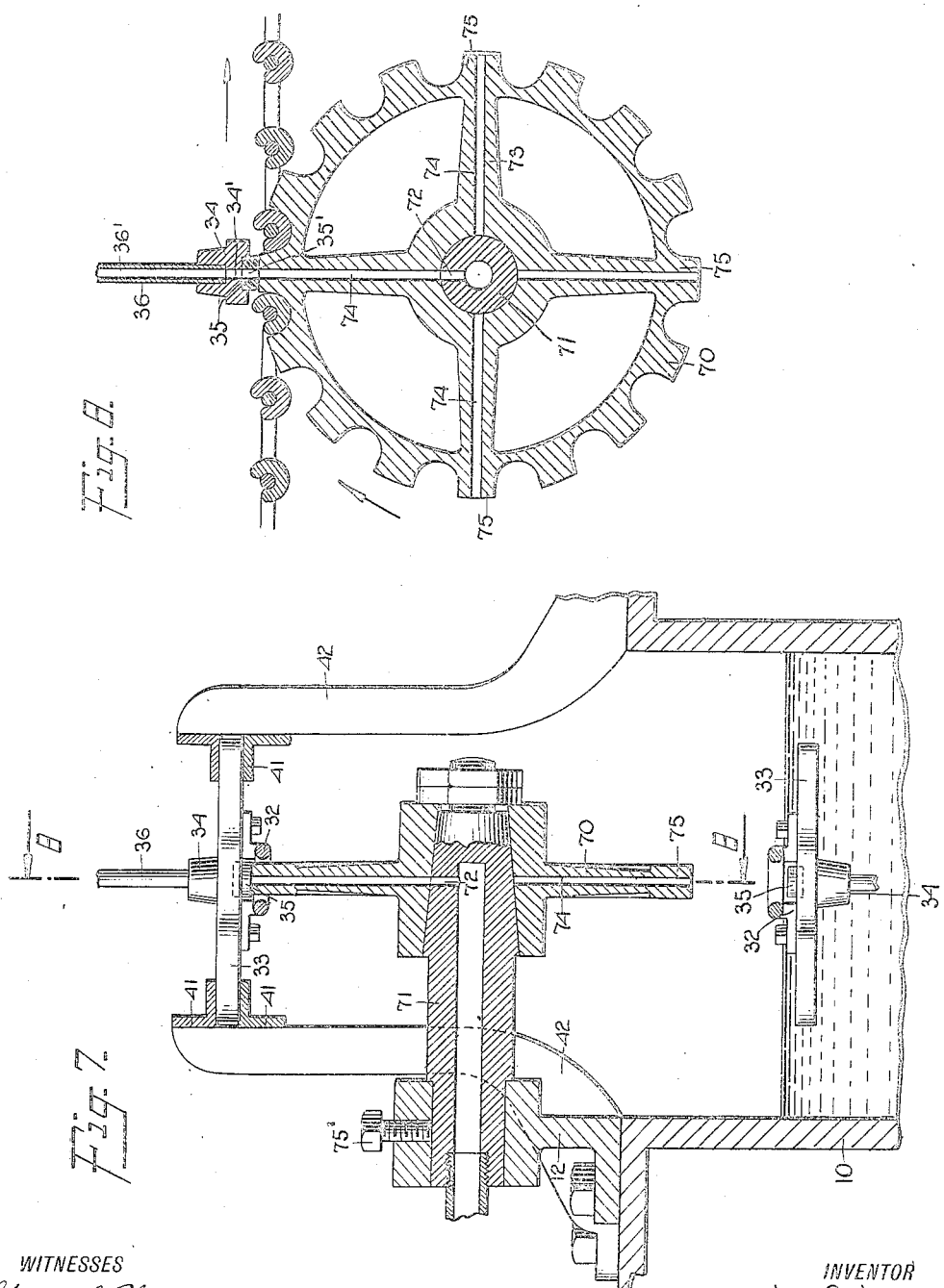

IRA COLE, OF DELPHOS, OHIO, ASSIGNOR TO THE RAPID BOTTLE WASHER CO., OF DELPHOS, OHIO.

BOTTLE-WASHING MACHINE.

1,214,278. Specification of Letters Patent. Patented Jan. 30, 1917.

Application filed December 22, 1915. Serial No. 68,197.

*To all whom it may concern:*

Be it known that I, IRA COLE, a citizen of the United States, and a resident of Delphos, in the county of Allen and State of Ohio, have invented a new and Improved Bottle-Washing Machine, of which the following is a full, clear, and exact description.

This invention relates to brushing and scrubbing and has particular reference to machines for the rapid and thorough sterilizing and cleansing of bottles.

Among the objects of the invention is to provide a machine with devices for receiving and conveying bottles in succession into and through a cleansing fluid and thence between a plurality or series of brushes which act upon all parts of the bottle, giving them a thorough scrubbing as they pass along toward the point of discharge.

Another object of the invention is to thoroughly spray both the inside and the outside of the bottles with cleansing fluids of different characters or different temperatures according to the exigencies of any particular line of operation.

A further object of the invention is to build a machine which will automatically accommodate itself to bottles of different sizes.

The foregoing and many other objects of the invention will hereinafter be more fully described and claimed and illustrated in the drawings forming a part of this specification in which like characters of reference indicate corresponding parts in all the views, and in which—

Figure 1 is an elevation of the right side of a preferred embodiment of this invention; Fig. 2 is a plan view of the same; Fig. 3 is a plan view and diagram showing the action of the scrubbing and revolving belts in connection with the means for causing the same to conform to varying diameters of bottles; Fig. 4 is a vertical longitudinal section on the line 4—4 of Fig. 2; Fig. 5 is an elevation of the left side of the machine; Fig. 6 is a vertical transverse section on the line 6—6 of Fig. 2; Fig. 7 is a vertical transverse section showing one of the jet wheels and parts associated therewith; and Fig. 8 is a vertical section on the line 8—8 of Fig. 7.

The several parts of this device may be made of any suitable materials, and the relative sizes and proportions, as well as the general design of the mechanism, may be varied to a considerable extent without departing from the spirit of the invention hereinafter more fully described and specifically claimed.

Referring more particularly to the drawings, I show at 10 a tank of any suitable length and supported upon any suitable framework or standards including legs 11 and frame 12. The ends of the tank are preferably rounded and this tank is adapted to contain a cleansing solution of any suitable character. As convenient means for heating the solution I provide any suitable number or arrangement of coils 13 in the bottom of the tank.

At 15 I provide an endless chain operating in a vertical longitudinal plane over front and rear sprocket wheels 16 and 17 respectively mounted upon shafts 18 and 19 across the front and rear portions of the tank and journaled in bearings 20 and 20' on the frame 12 of the tank.

The shaft 18, through which power is imparted to drive the chain in the direction indicated by the arrows, is rotated at moderate speed by means of a worm wheel 21 and worm 22, the latter being connected to a longitudinal shaft 23 supported at the front end in the gear casing 24 of which the bearing 20' is a part and at its rear end in a bearing or bracket 25. A power shaft 26 adapted to be rotated at any desired speed from a motor (not shown) or through pulleys 27 is supported adjacent the rear portion of the machine in a bearing 28 on one side of the machine and in a bracket 29 on the other side. A bevel gear 30 is secured to the power shaft adjacent the bearing 28 and serves to drive a gear 31 secured to the rear end of the worm shaft 23, the angular speed of the shaft 26 being considerably greater than that of the driven shaft 18.

At regular intervals, herein shown as every four links, the chain 15 is provided with a special link 32 to which is connected a guide plate 33 having a central boss or hub 34 with a recess in which is seated a soft rubber washer or gasket 35. Each boss 34 has fitted into it a stem 36 of a brush 37 of any suitable form or construction for cleansing the interior of a bottle adapted to be slipped down thereover. The stem 36 has a bore 36' registering with similar bores 34' and 35' of the boss and gasket respectively. With the machine in operation and the endless chain 15 operating in the direction shown by the arrows, an operator stationed at the front end of the machine may apply a bottle to each brush 37 until the chain is filled with bottles. Each bottle after it is applied to its brush, passes directly downwardly and is plunged by the action of the chain beneath the solution in the tank 10 where it is thoroughly soaked while passing horizontally rearwardly to the rear end of the machine where it is elevated and tilted, the solution within the bottle being thus emptied therefrom as the bottle comes into upright inverted position. When each bottle makes a complete circuit it is removed by the operator with one hand while a soiled bottle is replaced upon the same brush with the other hand.

While the bottles are passing from the rear end toward the front end of the machine, they are subjected to peculiar cleansing devices and operations. On each side of the row of bottles on the upper run of the chain is an endless belt, the two belts being arranged with their active faces opposite each other and in contact with opposite sides of the bottles. One of these belts shown at 38 is constructed preferably of some rubber composition of a nature rendering it substantially waterproof and adapted for its purpose in acting upon bottles, such belt being termed hereinafter the bottle revolving belt. The primary object of this belt is to cause the revolution or rotation of the bottles at comparatively high speed upon their respective brushes 37 and to facilitate the movement of the bottles in connection with the chain along and between the cleansing devices. The other belt shown at 39 and hereinafter termed the brush belt is preferably wider than the bottle revolving belt. The body of the brush belt 39 may be of rubber or other composition into which is woven or otherwise fixed an abrasive or scrubbing surface 40 which may be composed of any desired character of bristles or other device suited to the purpose of thoroughly brushing and cleansing the main portions of the sides of the bottle. Any suitable means may be provided for driving the belts 38 and 39. The active runs of these belts are arranged so that one operates in a reverse direction to the other and while the active run of the belt 38 is indicated as being in the same direction as the bottles are caused to be moved by the chain, though at a much more rapid rate, the active run of the brush belt is in the opposite direction and at a relatively slower speed. The bottles, therefore, are caused by these two belts to spin or rotate around their respective brushes, but since the belt 38 operates faster than the other, there is a certain degree of drag or abrasive action between the surfaces of the bottles and the brush belt whereby the vertical side portions of the bottles are thoroughly scrubbed while passing between the two belts.

As shown best in Fig. 6 and 7, the guide plates 33 pertaining to the bottles being acted upon by the scrubbing devices are guided between pairs of angle guides 41 secured in a horizontal direction on opposite sides of the plane of the chain 15, upon upwardly projecting brackets 42. These guides 41 in connection with the guide plates 33 maintain the bottles in a steady upright inverted position while they pass from the wheel 17 to the wheel 16.

At any suitable points along the line of movement of the bottles are arranged brushes 43 and 44, the former being arranged to scrub and cleanse the bottoms of the bottles and the latter to similarly act upon the necks of the bottles. See Fig. 6. The brush 43 is held in any desired adjusted position by means of shanks 45 secured to a cross head 46 secured upon the upper ends of a pair of posts 47 extending upwardly from the frame 12 about the middle portion of the machine. The brush 44 is supported upon a bracket 48 extending inwardly from one of the posts 47.

Any suitable means may be provided to operate the belts 38 and 39. I prefer to operate these belts from the same power shaft 26 as above described, and the means I show herein for accomplishing this purpose includes a pair of vertical shafts 49 and 50 for pulleys 51 and 52 respectively, over which the belt 38 operates, and a pair of shafts 53 and 54 which carry pulleys 55 and 56, respectively, for the brush belt. A bevel gear or pinion 57 connected to the shaft 49 meshes with and is driven from the above described bevel gear 30 on the power shaft. At 58 and 59 I show a pair of miter gears mounted upon the power shaft and vertical shaft 53 respectively, through which the brush belt is driven. As will be appreciated from Fig. 6, the disparity in diameters of the gears 30 and 57 insures a more rapid rotation of the shaft 49 than of the shaft 53, the ratio being substantially 2:1, though this is not to be interpreted as a necessary limitation in construction.

As shown best in Figs. 2 and 3, the shafts for the belt pulleys 52 and 56 are journaled in the front ends of swinging brackets 60 and 61 respectively, the rear ends of which are journaled upon the aforesaid fixed posts 47. More definitely stated, the shaft 50 is journaled in bearings 62 slidable in the outer end of the bracket 60 and the shaft 54 is likewise journaled in slidable bearings 63. These bearings are forced outwardly by springs 64 which tend to keep the belts under proper tension. The arms or brackets 60 and 61 tend to permit the front portions of the belts 38 and 39 to approach each other and hence hug the bottles irrespective of any variation in size or diameter of the bottles. Along the active run of each belt are tension devices shown as arms 65 arranged in pairs and pivoted at 66 upon brackets 67 also connected to the fixed post 47 each within its belt. Each of these arms 65 is acted upon by a spring 68 tending to force the adjacent belt outwardly toward the other belt, and hence, when a bottle of smaller diameter passes between the belts the opposing rollers 69 carried by these arms will force the belts into hugging or gripping action thereupon. The springs 68 may be slightly stronger than the springs 64 whereby the shortening of the effective length of either belt due to the passage of a small bottle may be compensated for by the compression upon the springs 64. In other words, the action of the several springs and the several sets of swinging arms or brackets just described provides for all variations in effective lengths of the belts or their relative positions with respect to each other while operating upon bottles of any variable diameter.

The automatic spraying of the bottles is performed by the devices shown best in Figs. 4, 7 and 8, such devices including a series of jet wheels 70 shown herein as three in number, the number being subject to any suitable variation according to the length of the machine. Each of these wheels is mounted upon a hollow arbor 71 having a radial port 72 projecting upwardly therefrom in the vertical plane of the bottle brush stems 36. Each jet wheel is illustrated as comprising four spokes 73, each having a radial bore 74, such bore extending out through a sprocket tooth 75. These wheels 70 are so designed that the circumferential distance between the teeth 75 is equal to the distance between special sprocket links 32 and guide plates 33 and hence each bottle, as its supporting link is received by a tooth 75 of the jet wheel, would receive a jet or spray of fluid from the interior of the arbor 71, such jet being delivered through the ports 72 and 74 and thence out through the hollow stem 36. The arbor is held in fixed position as by a set screw 75'. By providing series of these jet wheels, I may introduce different types of spraying fluids into the bottles as they progress toward the end of the machine. For instance, the first wheel may deliver water of a certain temperature to wash out the cleansing solution; the second wheel may deliver hotter water and the third may deliver a sterilizing steam. With the rinsing fluid introduced through these jet wheels at a reasonably high pressure, the short period of connection between each guide plate 33 and the tooth 75 while the ports 72 and 74 are in registration will be ample for the purpose specified and the amount of fluid thus introduced into each bottle will have had time to flow out before the next spraying action takes place.

At 76 I show a spraying device to rinse the outsides of the bottles so as to clear the same of any loose bristles or other particles which may adhere thereto after leaving the brushes. This spraying device preferably carries hot water through a pipe 77 which may be connected with the system of pipes 78 leading to the first two jet wheels. The application of steam to the last jet wheel may conveniently be had through a pipe 79 and from which the coils 13 may be heated. I show at 80 a conventional form of hand spraying device whereby any of the bottles may be sprayed by hand when they are taken from the brush stems 36.

I claim:

1. In a bottle washing machine, the combination of an endless sprocket chain, means including front and rear sprocket wheels for supporting and driving said chain in a certain direction in a vertical plane, a series of individual bottle holding brushes having hollow stems carried by equally spaced links of said chain and extending outwardly therefrom in said plane, a solution tank beneath the wheels and chain, the bottles carried by said brushes being plunged downwardly under the front wheel into the solution in the tank and carried thence beneath the solution past the rear wheel, and means for brushing and spraying all parts of the bottles after they are carried out of the solution toward the front wheel, said spraying means including a sprocket wheel, certain of whose teeth are hollow and register with said hollow stems.

2. In a bottle washing machine, the combination of an endless flexible member, front and rear wheels for supporting and driving said member in horizontal runs in a vertical plane, a series of individual bottle holding brushes having hollow stems connected to and carried by said member in said plane, means for soaking the bottles carried by said brushes during their movement along one run between the front and rear wheels, and means for brushing and spraying the bottles while they are moving along the other run between the rear and the front wheels, said spraying means including a jet wheel having radial spraying nozzles acting through said member and registering at the periphery of the wheel directly with said hollow stems.

3. In a bottle washing machine, the combination of an endless flexible member, front and rear wheels supporting and driving said member in horizontal runs in a vertical plane, a series of equally spaced individual bottle holding brushes having hollow stems secured to said flexible member and extending outwardly therefrom in said plane, means for soaking the bottles carried by said brushes while they move with said member along one of the runs between the front and rear wheels, and means for scrubbing and spraying all portions of the bottles as they are carried along the other run from the rear to the front wheel, said spraying means including a jet wheel having radially arranged nozzles acting through said flexible member and registering with said hollow stems in succession as they pass thereover.

4. The combination with a sprocket chain, individual bottle holding brushes having hollow stems secured thereto at equally spaced intervals, and means for operating said chain and brushes, of a jet wheel, certain of whose teeth consist of radially disposed nozzles acting through said chain and registering with the hollow stems in succession as the chain passes thereover.

5. The combination with an endless sprocket chain, a series of equally spaced individual bottle holding brushes having hollow stems secured to and carried by said chain, and means to operate the chain, of spraying means including an idler sprocket wheel having radially disposed nozzles registering with said hollow stems in succession as the chain is moved thereover.

6. In a bottle washing machine, the combination of an endless flexible member, front and rear wheels for supporting and operating said member in a vertical plane, a series of individual bottle holding brushes secured to said member and projecting outwardly therefrom in said plane, means to soak the bottles as they are carried on said brushes while passing from the front to the rear wheel, and means to cause the bottles to spin on their respective brushes after the bottles emerge from the soaking device and travel between the rear and front wheels.

7. In a bottle washing machine, the combination of an endless flexible member, front and rear wheels for supporting said member in horizontal runs in a vertical plane, individual bottle holding brushes carried by said member and projecting outwardly therefrom in said plane, a solution tank beneath said wheels, the bottles carried by the brushes being plunged beneath the solution and carried along the same along the lower horizontal run, and means to cause the bottles to spin on their respective brushes while they move along the upper horizontal run whereby the inner surfaces thereof are scrubbed, said spinning means serving to scrub the outer portions of the bottles.

8. In a bottle washing machine, the combination of an endless flexible member, means to support and operate said member in a vertical plane, individual bottle holding brushes carried by said member and extending therefrom upwardly and downwardly in said plane, means to soak the bottles carried by the downwardly projecting brushes, and a pair of belts operating on opposite sides of the upwardly projecting bottles to cause the bottles to spin on their holding brushes whereby the inner surfaces of the bottles are scrubbed after emerging from the soaking means.

9. In a bottle washing machine, the combination of an endless flexible member, front and rear wheels for supporting and operating said member in a vertical plane along horizontal runs, a series of individual bottle holding brushes secured to and carried by said flexible member, said brushes extending downwardly along the lower run and upwardly along the upper run between the front and rear wheels, a solution tank into which the bottles along the lower run are plunged and soaked, and a pair of oppositely arranged belts acting upon the upwardly projecting bottles causing them to spin on their respective holding brushes after they emerge from the solution tank whereby the interior surfaces of the bottles are scrubbed, said belts serving also to scrub the outer surfaces of the bottles at the same time the inner surfaces are scrubbed.

10. In a bottle washing machine, the combination of an endless flexible member, front and rear wheels for supporting and operating said member in a vertical plane, a series of individual bottle holding brushes having hollow stems secured to the said member and projecting outwardly therefrom in said plane, a solution tank beneath the wheels into which the bottles carried by said brush holders are plunged for soaking while passing from the front to the rear wheel, a pair of endless belts acting upon opposite sides of the bottles as they pass between the rear and the front wheels after emerging from the solution tank, causing the bottles to spin on their respective holding brushes for scrubbing the interior surfaces thereof, and means for scrubbing the bottoms of the bottles simultaneously with the scrubbing of the inner surfaces thereof.

11. In a bottle washing machine, the combination of an endless flexible member, front and rear wheels for supporting and operating the same in a certain direction in a vertical plane, a series of individual bottle holding brushes secured to and carried by said endless member and projecting outwardly therefrom in said plane, a solution tank beneath the wheels into which the bottles carried by the downwardly projecting brushes are plunged and carried for soaking between the front and the rear wheels, and a pair of belts acting upon opposite sides of the bottles after they emerge from the solution tank and are traveling between the rear and the front wheels, said belts causing the bottles to spin on their respective holding brushes for scrubbing the inner surfaces thereof, one of said belts constituting a scrubbing device for the outsides of the bottles.

12. In a bottle washing machine, the combination of a pair of oppositely arranged belts, means to operate said belts with their adjacent runs in opposite directions, a series of individual bottle holding brushes, means to positively move said holding brushes in succession between said belts whereby the insides and the outsides of the bottles are scrubbed as they move along, and means serving to automatically cause said belts to approach each other to conform to bottles of smaller diameters.

13. In a bottle washing machine, the combination of a pair of endless belts, means for supporting said belts in substantially the same plane, said supporting means including a pair of wheels for each belt, one wheel having a fixed axis and the other a movable axis, means acting upon the wheel of each belt having a movable axis to maintain proper tension thereon, a series of individual bottle holding brushes, means to positively move said holding brushes between the opposed runs of said belts whereby bottles carried by said brushes are engaged by said belts and caused to spin on their respective brushes as they move along, and resilient means acting upon the active run of each belt between the supporting wheels thereof to cause the belts to conform to bottles of varying diameters.

14. In a bottle washing machine, the combination of a series of individual bottle holding brushes having hollow stems, means to positively move said holding brushes along definite lines, means to act upon bottles supported upon said brushes to cause the bottles to spin upon their respective holding brushes irrespective of the diameters of the bottles whereby the inner and outer surfaces of the bottles are scrubbed, and a series of wheels having radial peripheral jets acting through said hollow stems for spraying the inner surfaces of the bottles first with liquid and finally with steam while they are moved along said definite lines.

In testimony whereof I have signed my name to this specification in the presence of two subscribing witnesses.

IRA COLE.

Witnesses:
WILLARD PAINE OHLER,
FATT CAMINITTO.